United States Patent
Xie et al.

(10) Patent No.: US 10,968,349 B2
(45) Date of Patent: Apr. 6, 2021

(54) COMPOSITION AND METHOD FOR REDUCING ALDEHYDE CONTENT IN POLYURETHANE FOAMS

(71) Applicant: Milliken & Company, Spartanburg, SC (US)

(72) Inventors: Chunping Xie, Shanghai (CN); Shengjun Yao, Shanghai (CN)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 16/291,606

(22) Filed: Mar. 4, 2019

(65) Prior Publication Data

US 2019/0300706 A1    Oct. 3, 2019

Related U.S. Application Data

(60) Provisional application No. 62/648,626, filed on Mar. 27, 2018.

(51) Int. Cl.

| | |
|---|---|
| *C07C 41/46* | (2006.01) |
| *C08G 18/76* | (2006.01) |
| *C08G 18/66* | (2006.01) |
| *C08L 71/02* | (2006.01) |
| *C08G 18/63* | (2006.01) |
| *C08G 18/64* | (2006.01) |
| *C08G 18/32* | (2006.01) |
| *C07C 43/13* | (2006.01) |
| *C08G 73/02* | (2006.01) |
| *C08L 75/08* | (2006.01) |
| *C08J 3/22* | (2006.01) |
| *C08J 9/00* | (2006.01) |
| *C08J 9/28* | (2006.01) |
| *C08G 18/40* | (2006.01) |
| *C08G 18/48* | (2006.01) |

(52) U.S. Cl.
CPC .......... *C08L 75/08* (2013.01); *C08G 18/3228* (2013.01); *C08G 18/3275* (2013.01); *C08G 18/4072* (2013.01); *C08G 18/48* (2013.01); *C08G 18/632* (2013.01); *C08G 18/6681* (2013.01); *C08G 18/7621* (2013.01); *C08J 3/226* (2013.01); *C08J 9/0066* (2013.01); *C08J 9/286* (2013.01); *C08J 2201/022* (2013.01); *C08J 2375/08* (2013.01); *C08J 2479/02* (2013.01); *C08L 2203/14* (2013.01); *C08L 2310/00* (2013.01)

(58) Field of Classification Search
CPC .. C08L 75/08; C08L 2203/14; C08L 2310/00; C08G 18/7621; C08G 18/632; C08G 18/3228; C08G 18/3275; C08G 18/4072; C08G 18/48; C08G 18/6681; C08J 3/226; C08J 9/0066; C08J 9/286; C08J 2201/022; C08J 2375/08; C08J 2479/02
See application file for complete search history.

(56) References Cited

U.S. PATENT DOCUMENTS

| | | | |
|---|---|---|---|
| 3,634,081 A * | 1/1972 | Forst | G03C 7/3046 430/423 |
| 4,082,884 A | 4/1978 | DeLong | |
| 4,892,719 A * | 1/1990 | Gesser | B01D 53/34 423/245.1 |
| 5,284,892 A | 2/1994 | Brodie, III et al. | |
| 5,350,788 A | 9/1994 | Visioli et al. | |
| 6,723,836 B1 | 4/2004 | Araki et al. | |
| 2013/0330532 A1* | 12/2013 | Dierschke | C04B 16/04 428/220 |
| 2014/0227544 A1 | 8/2014 | Inoue et al. | |
| 2017/0088497 A1* | 3/2017 | Xie | C08G 18/6688 |

FOREIGN PATENT DOCUMENTS

| | | |
|---|---|---|
| CN | 101376050 A | 4/2009 |
| CN | 106 430 616 A | 2/2017 |
| CN | 106 757 202 A | 5/2017 |
| DE | 695 17 128 T2 | 1/2001 |
| JP | 2015-38261 A1 | 2/2015 |
| WO | WO 2008/138482 A1 | 11/2008 |
| WO | WO 2016/022876 A1 | 2/2016 |
| WO | WO 2016/155993 A1 | 10/2016 |

OTHER PUBLICATIONS

PCT/US2019/020544 International Search Report, filed Mar. 4, 2019, 4 pages.
PCT/US2019/020544 Written Opinion of the International Searching Authority, filed Mar. 4, 2019, 7 pages.

* cited by examiner

*Primary Examiner* — Andrew J. Oyer
(74) *Attorney, Agent, or Firm* — Robert M. Lanning

(57) ABSTRACT

A composition comprises a polyol, a polyethylenimine compound, and a sulfite compound. A method for producing a polyurethane polymer comprises the steps of: (a) providing a polyol; (b) providing an additive composition comprising a polyethylenimine compound and a sulfite compound; (c) combining the polyol and the additive composition to produce a polyol composition; (d) providing an isocyanate compound; and (e) combining and reacting the polyol composition and the isocyanate composition to produce a polyurethane polymer.

15 Claims, No Drawings

COMPOSITION AND METHOD FOR REDUCING ALDEHYDE CONTENT IN POLYURETHANE FOAMS

CROSS-REFERENCE TO RELATED PATENT APPLICATIONS

This application claims, pursuant to 35 U.S.C. § 119(e), priority to and the benefit of the filing date of U.S. Patent Application No. 62/648,626 filed on Mar. 27, 2018, the contents of which are hereby incorporated by reference.

TECHNICAL FIELD OF THE INVENTION

This application is directed to compositions and methods for reducing the release of aldehydes from polyurethane polymers, such as polyurethane foams.

BACKGROUND

Polyurethane polymers are used in a wide variety of applications, such as the production of polyurethane foams. These polyurethane foams are, in turn, put to many different end uses. For example, polyurethane foams are frequently used as cushioning and padding in, for example, transportation seating (e.g., automobile seating) and furniture, such as mattresses and other cushioned furniture. When these polyurethane foams are used in enclosed environments, such as the interior of an automobile or other vehicle, the foam typically must pass tests that limit the amount of volatile organic compounds that can be released by the foam. The volatile organic compounds emitted by the polyurethane foam during testing can be produced as a by-product of the reaction that produces the polyurethane polymer. The volatile organic compounds (e.g., aldehydes such as formaldehyde, acetaldehyde, and propionaldehyde) can also be present in the raw materials used to make the foam (e.g., the polyol). These volatile organic compounds can impart undesirable, foul odors to the raw materials and to the polyurethane polymers/foams made with those raw materials. Therefore, it would be desirable to find a composition or method that reduces the detectable levels of volatile organic compounds present in these raw materials and/or the polyurethane polymers/foams made with such materials. This application seeks to provide such a composition and method.

BRIEF SUMMARY OF THE INVENTION

In a first embodiment, the invention provides a composition comprising:
  (a) a polyol;
  (b) a polyethylenimine compound; and
  (c) a sulfite compound.
In a second embodiment, the invention provides a method for producing a polyurethane polymer, the method comprising the steps of:
  (a) providing a polyol;
  (b) providing an additive composition comprising a polyethylenimine compound and a sulfite compound;
  (c) combining the polyol and the additive composition to produce a polyol composition;
  (d) providing an isocyanate compound; and
  (e) combining and reacting the polyol composition and the isocyanate compound to produce a polyurethane polymer.

DETAILED DESCRIPTION OF THE INVENTION

In a first embodiment, the invention provides a composition comprising a polyol, a polyethylenimine compound, and a sulfite compound. The combination of the polyethylenimine compound and the sulfite compound, when added to the components (e.g., polyol) used in the manufacture of a polyurethane foam, has surprisingly been found to reduce aldehyde emissions from the polyurethane foam. Further, the combination of the polyethylenimine compound and the sulfite compound does not exhibit any sulfurous odors that can be exhibited by other combinations containing sulfur compounds.

The composition can comprise any suitable polyol. Suitable polyols include polyether polyols and polyester polyols. Preferably, the polyol is a polyether polyol. Suitable polyether polyols include those made by reacting epoxides, such as ethylene oxide, propylene oxide, butylene oxide, and glycidol, with a multifunctional initiator compound, such as a multifunctional alcohol or amine. Examples of suitable multifunctional initiator compounds include, but are not limited to, water, glycerin, pentaerythritol, ethylene glycol, propylene glycol (e.g., 1,2-propylene glycol), trimethylolpropane, and ethylene diamine.

The polyol can have any suitable molar mass. In a preferred embodiment, the polyol has a molar mass of about 400 g/mol or more. More preferably, the polyol has a molar mass of about 500 g/mol or more, about 750 g/mol or more, or about 1,000 g/mol or more.

The polyol used in making the composition can contain volatile aldehyde compounds, such as formaldehyde, acetaldehyde, and propionaldehyde. While not wishing to be bound to any particular theory, it is believed that these volatile aldehyde compounds can be produced during the production of the polyol itself or by the oxidative degradation of the polyol during storage. Prior to incorporation of the polyethylenimine compound and sulfite compound, the untreated polyol can contain as much as 3 ppm or more of volatile aldehyde compounds (e.g., formaldehyde, acetaldehyde, and/or propionaldehyde) based on the weight of the polyol.

The composition can comprise any suitable polyethylenimine compound. The polyethylenimine compound can be a linear polyethylenimine or a branched polyethylenimine. Preferably, the polyethylenimine compound is a branched polyethylenimine. The polyethylenimine can have any suitable degree of polymerization or molar mass. Preferably, the polyethylenimine compound has an average molar mass of about 500 g/mol or more. The polyethylenimine compound more preferably has an average molar mass of about 600 g/mol or more, about 700 g/mol or more, about 800 g/mol or more, about 900 g/mol or more, or about 1,000 g/mol or more. Preferably, the polyethylenimine compound has an average molar mass of about 50,000 g/mol or less. The polyethylenimine compound more preferably has an average molar mass of about 40,000 g/mol or less, about 30,000 g/mol or less, about 20,000 g/mol or less, about 10,000 g/mol or less, or about 5,000 g/mol or less. Thus, in a series of preferred embodiments, the polyethylenimine compound has an average molar mass of about 500 g/mol to about 50,000 g/mol, about 600 g/mol to about 40,000 g/mol, about 700 g/mol to about 30,000 g/mol, about 800 g/mol to about 20,000, about 900 g/mol to about 10,000 g/mol, or about 1,000 g/mol to about 5,000 g/mol (e.g., about 3,000 g/mol to about 4,000 g/mol).

The polyethylenimine compound can be present in the composition in any suitable amount. The polyethylenimine compound preferably is present in the composition in an amount of about 50 ppm or more, based on the weight of the polyol present in the composition. More preferably, the polyethylenimine compound is present in the composition in an amount of about 75 ppm or more, about 100 ppm or more, about 125 ppm or more, about 150 ppm or more, about 175 ppm or more, about 200 ppm or more, about 300 ppm or more, about 400 ppm or more, or about 500 ppm or more, based on the weight of the polyol present in the composition. The polyethylenimine compound preferably is present in the composition in an amount of about 20,000 ppm or less, about 15,000 ppm or less, about 10,000 ppm or less, about 5,000 ppm or less, about 4,000 ppm or less, or about 3,000 ppm or less, based on the weight of the polyol present in the composition. Thus, in a series of preferred embodiments, the polyethylenimine compound is present in the composition in an amount of about 50 ppm to about 20,000 ppm (e.g., about 100 ppm to about 20,000 ppm, about 150 ppm to about 20,000 ppm, about 200 ppm to about 20,000 ppm, about 300 ppm to about 20,000 ppm, about 400 ppm to about 20,000 ppm, or about 500 ppm to about 20,000 ppm), about 50 ppm to about 15,000 ppm (e.g., about 100 ppm to about 15,000 ppm, about 150 ppm to about 15,000 ppm, about 200 ppm to about 15,000 ppm, about 300 ppm to about 15,000 ppm, about 400 ppm to about 15,000 ppm, or about 500 ppm to about 15,000 ppm), about 50 ppm to about 10,000 ppm (e.g., e.g., about 100 ppm to about 10,000 ppm, about 150 ppm to about 10,000 ppm, about 200 ppm to about 10,000 ppm, about 300 ppm to about 10,000 ppm, about 400 ppm to about 10,000 ppm, or about 500 ppm to about 10,000 ppm), about 50 ppm to about 5,000 ppm, (e.g., about 100 ppm to about 5,000 ppm, about 150 ppm to about 5,000 ppm, about 200 ppm to about 5,000 ppm, about 300 ppm to about 5,000 ppm, about 400 ppm to about 5,000 ppm, or about 500 ppm to about 5,000 ppm), about 50 ppm to about 4,000 ppm, (e.g., about 100 ppm to about 4,000 ppm, about 150 ppm to about 4,000 ppm, about 200 ppm to about 4,000 ppm, about 300 ppm to about 4,000 ppm, about 400 ppm to about 4,000 ppm, or about 500 ppm to about 4,000 ppm), about 50 ppm to about 3,000 ppm, (e.g., about 100 ppm to about 3,000 ppm, about 150 ppm to about 3,000 ppm, about 200 ppm to about 3,000 ppm, about 300 ppm to about 3,000 ppm, about 400 ppm to about 3,000 ppm, or about 500 ppm to about 3,000 ppm), about 50 ppm to about 2,000 ppm, (e.g., about 100 ppm to about 2,000 ppm, about 150 ppm to about 2,000 ppm, about 200 ppm to about 2,000 ppm, about 300 ppm to about 2,000 ppm, about 400 ppm to about 2,000 ppm, or about 500 ppm to about 2,000 ppm), based on the weight of the polyol present in the composition.

The composition further comprises a sulfite compound in addition to the polyol and the polyethylenimine compound. The sulfite compound can be any suitable sulfite compound, such as an alkali metal sulfite compound or an alkaline earth metal sulfite compound. In a preferred embodiment, the sulfite compound is sodium sulfite.

The sulfite compound can be present in the composition in any suitable amount. The sulfite compound preferably is present in the composition in an amount of about 50 ppm or more, based on the weight of the polyol present in the composition. More preferably, the sulfite compound is present in the composition in an amount of about 75 ppm or more, about 100 ppm or more, about 125 ppm or more, about 150 ppm or more, about 175 ppm or more, about 200 ppm or more, about 300 ppm or more, about 400 ppm or more, or about 500 ppm or more, based on the weight of the polyol present in the composition. The sulfite compound preferably is present in the composition in an amount of about 20,000 ppm or less, about 15,000 ppm or less, about 10,000 ppm or less, about 5,000 ppm or less, about 4,000 ppm or less, or about 3,000 ppm or less, based on the weight of the polyol present in the composition. Thus, in a series of preferred embodiments, the sulfite compound is present in the composition in an amount of about 50 ppm to about 20,000 ppm (e.g., about 100 ppm to about 20,000 ppm, about 150 ppm to about 20,000 ppm, about 200 ppm to about 20,000 ppm, about 300 ppm to about 20,000 ppm, about 400 ppm to about 20,000 ppm, or about 500 ppm to about 20,000 ppm), about 50 ppm to about 15,000 ppm (e.g., about 100 ppm to about 15,000 ppm, about 150 ppm to about 15,000 ppm, about 200 ppm to about 15,000 ppm, about 300 ppm to about 15,000 ppm, about 400 ppm to about 15,000 ppm, or about 500 ppm to about 15,000 ppm), about 50 ppm to about 10,000 ppm (e.g., about 100 ppm to about 10,000 ppm, about 150 ppm to about 10,000 ppm, about 200 ppm to about 10,000 ppm, about 300 ppm to about 10,000 ppm, about 400 ppm to about 10,000 ppm, or about 500 ppm to about 10,000 ppm), about 50 ppm to about 5,000 ppm, (e.g., about 100 ppm to about 5,000 ppm, about 150 ppm to about 5,000 ppm, about 200 ppm to about 5,000 ppm, about 300 ppm to about 5,000 ppm, about 400 ppm to about 5,000 ppm, or about 500 ppm to about 5,000 ppm), about 50 ppm to about 4,000 ppm, (e.g., about 100 ppm to about 4,000 ppm, about 150 ppm to about 4,000 ppm, about 200 ppm to about 4,000 ppm, about 300 ppm to about 4,000 ppm, about 400 ppm to about 4,000 ppm, or about 500 ppm to about 4,000 ppm), about 50 ppm to about 3,000 ppm, (e.g., about 100 ppm to about 3,000 ppm, about 150 ppm to about 3,000 ppm, about 200 ppm to about 3,000 ppm, about 300 ppm to about 3,000 ppm, about 400 ppm to about 3,000 ppm, or about 500 ppm to about 3,000 ppm), or about 50 ppm to about 2,000 ppm, (e.g., about 100 ppm to about 2,000 ppm, about 150 ppm to about 2,000 ppm, about 200 ppm to about 2,000 ppm, about 300 ppm to about 2,000 ppm, about 400 ppm to about 2,000 ppm, or about 500 ppm to about 2,000 ppm), based on the weight of the polyol present in the composition.

The amounts of the polyethylenimine compound and the sulfite compound present in the composition can also be expressed in relative terms. Preferably, the sulfite compound is present in the composition in an amount of about 0.5 parts by weight or more per 1 part by weight of polyethylenimine compound. The sulfite compound preferably is present in the composition in an amount of about 5 parts by weight or less per 1 part by weight of polyethylenimine compound. Thus, in a more specific preferred embodiment, the sulfite compound is present in the composition in an amount of about 0.5 to about 5 parts by weight per 1 part by weight of polyethylenimine compound. In a particularly preferred embodiment, the sulfite compound is present in the composition in an amount of about 3 to about 5 parts by weight per 1 part by weight of the polyethylenimine compound.

The composition can comprise other components in addition to the polyol, the polyethylenimine compound, and the sulfite compound. For example, the composition can further comprise water. When present in the composition, the water can be present in any suitable amount, though the water typically is present in a relatively minor amount relative to the amount of polyol. For example, the water typically is present in the composition in an amount of about 10 wt. % or less, or about 5 wt. % or less based on the weight of the composition. The amount of water present in the composition can alternatively be expressed in relation to the combined weight of polyethylenimine compound and sulfite compound present in the composition. Thus, in certain embodiments, the amount of water present in the composition is substantially equal to or greater than the combined weight of the polyethylenimine compound and the sulfite compound present in the composition. In another embodiment, the amount of water present in the composition is no greater than about 10 times or no greater than about 5 times the combined weight of the polyethylenimine compound and the sulfite compound present in the composition. In a series of preferred embodiments, the amount of water present in the composition is from about 1 to about 10 times the combined weight of the polyethylenimine compound and the sulfite compound present in the composition, more preferably about 1 to about 5 times the combined weight of the polyethylenimine compound and the sulfite compound present in the composition.

In another embodiment, the composition can comprise a second amine compound in addition to the polyethylenimine compound. In a preferred embodiment, the composition further comprises diethanolamine, tert-butylamine (i.e., 2-methylpropan-2-amine), or a mixture thereof as the second amine compound. When present in the composition, the second amine compound can be present in any suitable amount. If the second amine compound is present in the composition, the second amine compound preferably is present in the composition in an amount of about 5 ppm or more, based on the weight of the polyol present in the composition. More preferably, the second amine compound preferably is present in the composition in an amount of about 10 ppm or more, about 15 ppm or more, about 20 ppm or more, or about 25 ppm or more, based on the weight of the polyol in the composition. In another embodiment, the second amine compound preferably is present in the composition in an amount of about 200 ppm or less, about 150 ppm or less, or about 100 ppm or less, based on the weight of the polyol in the composition. Thus, in a series of preferred embodiments, the second amine compound is present in the composition in an amount of about 5 ppm to about 200 ppm (e.g., about 10 ppm to about 200 ppm, about 15 ppm to about 200 ppm, about 20 ppm to about 200 ppm, or about 25 ppm to about 200 ppm), about 5 ppm to about 150 ppm (e.g., about 10 ppm to about 150 ppm, about 15 ppm to about 150 ppm, about 20 ppm to about 150 ppm, or about 25 ppm to about 150 ppm), or about 5 ppm to about 100 ppm (e.g., about 10 ppm to about 100 ppm, about 15 ppm to about 100 ppm, about 20 ppm to about 100 ppm, or about 25 ppm to about 100 ppm), based on the weight of the polyol in the composition.

The composition described above can be used in the production of polyurethane polymers (e.g., polyurethane foams). Thus, in a second embodiment, the invention provides a method for making a polyurethane polymer. The method comprises the steps of: (a) providing a polyol; (b) providing an additive composition comprising a polyethylenimine compound and a sulfite compound; (c) combining the polyol and the additive composition to produce a polyol composition; (d) providing an isocyanate compound; and (e) combining and reacting the polyol composition and the isocyanate compound to produce a polyurethane polymer.

In the method of the invention, the polyol composition described above can be used alone as the sole source of polyol, or the polyol composition can be used in conjunction with one or more other polyols. The polyol or mixture of polyols used in the production of the polyurethane polymer will depend, at least in part, on the desired properties of the polymer.

In the method, any suitable isocyanate compound or combination of isocyanate compounds can be used. Suitable isocyanate compounds include, but are not limited to, toluene diisocyanate and diphenylmethane diisocyanate.

Typically, the polyol(s) and the isocyanate compound are reacted in the presence of a catalyst, such as an amine catalyst, an organometallic catalyst (e.g., organotin compounds), or a mixture of the two. Amine catalysts, which are typically tertiary amine compounds, are the most commonly used catalysts in the production of flexible polyurethane foams, such as those used in seating and other cushioning applications.

The composition of the invention and polyurethane polymers made therewith are believed to have several advantages. For example, certain combinations of polyethylenimine with other sulfur-containing compounds (i.e., sulfur-containing compounds other than sulfite compounds) have been observed to significantly corrode certain ferrous metals. However, the inventive combination of polyethylenimine compound and sulfite compound has not been observed to corrode ferrous metals. This lack of corrosion is significant because ferrous metals are frequently used for piping and storage in industrial settings, and corrosion of those metals can damage equipment, contaminate products, and cause shutdowns.

Further, polyurethane foams made with a combination of polyethylenimine and other sulfur-containing compounds have been observed to have an unpleasant sulfurous odor. Indeed, testing of some foams has revealed that the foams can contain appreciable amounts of sulfur dioxide, which is a gas that has a pungent, irritating smell and can be toxic at high levels. The presence of sulfur dioxide in such foams can pose problems for the use of the foams in enclosed spaces, where the gas can accumulate and create an unpleasant experience for those exposed to the pungent, irritating smell. Further, the generation of such gas during the production of the polyurethane foam can make for an unpleasant work environment. On the other hand, polyurethane foams made with the inventive combination of a polyethylenimine compound and a sulfite compound have not been observed to contain detectable amounts of sulfur dioxide.

Lastly, as noted above, many polyurethane foams have been observed to emit various volatile organic compounds, such as aldehyde compounds. These aldehyde compounds can have pungent odors, and prolonged exposure to such compounds can have adverse health effects. These odors and exposure hazards typically are exacerbated when the foams are placed into an enclosed space, such as the interior of a vehicle. In such enclosed spaces, the volatile organic compounds (e.g., aldehyde compounds) emitted by the polyurethane foam can quickly accumulate and rise to concentrations that are unpleasant or pose health hazards to vehicle occupants. When used as an additive in the manufacture of a polyurethane foam, the inventive combination of a polyethylenimine compound and a sulfite compound has been shown to dramatically lower the amount of aldehyde compounds emitted by the polyurethane foam. As shown in the following examples, experimental observations have shown that the inventive combination of a polyethylenimine compound and a sulfite compound lowers levels of formaldehyde and acetaldehyde emitted by the foam. The observed levels were significantly lower than what one would expect from simply adding the effect of each component alone. Indeed, the combination shows a synergy that would not have been expected given the data observed when each compound is used separately.

The following examples further illustrate the subject matter described above but, of course, should not be construed as in any way limiting the scope thereof.

EXAMPLE 1

This example demonstrates the production of a composition according to the invention and the use of this composition in the production of a polyurethane polymer, more specifically a polyurethane foam. The results of the example also show the dramatic reductions in aldehyde emissions that have been observed from polyurethane polymers/foams made with the composition of the invention.

When present in the foam formulation as noted in Table 1 below, $Na_2SO_3$ (0.452 g, 3.59 mmol) and/or a polyethylenimine compound (PEI) having an average molar mass of about 3,500 g/mol (0.113 g) were first added to 8 g of water. The solution was then added into a beaker, and approximately 158 g of polyol were then added to the beaker. The mixture was stirred at ambient temperature for approximately 30 seconds at a speed of approximately 4,000 rpm. Grafted Polyol (68 g), triethylenediamine (33%, 0.6 mL), diethanolamine (3.4 g), Niax Catalyst EF-150 (0.72 g) and Niax Y-10366 foam stabilizer (2.2 g) were then added to the beaker. The resulting mixture was then stirred at ambient temperature for approximately 30 seconds at a speed of approximately 4,000 rpm. An isocyanate composition, specifically TM80 (106 g, TDI:PM200=80:20), was then added while the mixture was rapidly stirred. The resulting mixture was stirred for approximately 5-8 additional seconds at a speed of approximately 4,000 rpm. The mixture was then cast into a mold that was maintained at approximately 75° C. in a water bath. After an approximately 5-minute cure, the mold was removed from the water bath, and the foam was removed from the mold. The foam was cooled down, squeezed and packed with silver paper at ambient temperature overnight. The foam was then tested to determine aldehyde emissions.

TABLE 1

Additive content (expressed as ppm based on the polyol content) and corresponding reduction in aldehyde content for Samples 1A-1D.

| | Additive Content (ppm) | | Reduction in Aldehyde content (%) | |
|---|---|---|---|---|
| Sample | PEI | $Na_2SO_3$ | Formaldehyde | Acetaldehyde |
| 1A | 0 | 0 | — | — |
| 1B | 500 | 0 | −29.0 | −2.0 |
| 1C | 0 | 2,000 | 89.3 | 73.3 |
| 1D | 500 | 2,000 | 90.4 | 87.9 |

As can be seen from the data in Table 1, the sample made with only PEI (Sample 1B) did not exhibit a measurable decrease in the formaldehyde and acetaldehyde levels relative to the control sample (Sample 1A). In fact, the formaldehyde levels increased by almost 30% over those measured in the control sample. The sample made with only sodium sulfite (Sample 1C) exhibited reductions in both formaldehyde and acetaldehyde levels, though the reduction in acetaldehyde levels lagged the reduction in formaldehyde levels. The sample made with the composition of the invention (Sample 1 D) exhibited dramatic reductions in both the formaldehyde and acetaldehyde levels. The formaldehyde levels were decreased one additional percentage point below those observed for Sample 1C, and the acetaldehyde levels were decreased an additional 14.6 percentage points below those observed for Sample 1C. This result is surprising because the experimental evidence (from Sample 1B) suggests that the addition of the polyethylenimine compound should not result in decreases in either the formaldehyde or acetaldehyde levels. Rather, the experimental evidence suggests that addition of the polyethylenimine compound should result in a modest increase (or at least no reduction) in acetaldehyde levels and an appreciable increase (by approximately 30 percentage points) in formaldehyde levels. And yet, the experimental evidence shows that the combination of sodium sulfite with a polyethylenimine compound delivers greater reductions in both formaldehyde and acetaldehyde levels than either compound delivered alone. Indeed, the combination actually shows a synergistic reversal of the trend toward higher aldehyde levels observed when a polyethylenimine compound alone is added.

The reduction in aldehyde levels observed for the composition of the invention is commercially significant. It should dramatically reduce the amount of aldehydes released by the foam over time, thereby ensuring that the foam and articles made with the foam (e.g., automotive seating) can meet the stringent requirements for volatile organic compound emissions mandated by the automotive industry.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A composition comprising:
   (a) a polyether polyol produced by reacting one or more epoxide compounds with a multifunctional initiator compound selected from the group consisting of multifunctional alcohols and multifunctional amines;
   (b) a polyethylenimine compound; and
   (c) a sulfite compound.

2. The composition of claim 1, wherein the polyether polyol has a molar mass of about 400 g/mol or more.

3. The composition of claim 1, wherein the polyethylenimine compound is present in the polyether polyol in an amount of about 100 ppm or more, based on the weight of the polyether polyol.

4. The composition of claim 3, wherein the polyethylenimine compound is present in the polyether polyol in an amount of about 100 ppm to about 2,000 ppm, based on the weight of the polyether polyol.

5. The composition of claim 1, wherein the polyethylenimine compound has a molar mass of about 500 g/mol or more.

6. The composition of claim 1, wherein the sulfite compound is sodium sulfite.

7. The composition of claim 1, wherein the polyethylenimine compound and the sulfite compound are present in an amount of about 0.5 to about 5 parts by weight sulfite compound per 1 part by weight of the polyethylenimine compound.

8. The composition of claim 7, wherein the polyethylenimine compound and the sulfite compound are present in an amount of about 3 to about 5 parts by weight sulfite compound per 1 part by weight of the polyethylenimine compound.

9. The composition of claim 1, wherein the sulfite compound is present in the composition in an amount of about 100 ppm or more, based on the weight of the polyether polyol.

10. The composition of claim 9, wherein the sulfite compound is present in the composition in an amount of about 100 ppm to about 5,000 ppm, based on the weight of the polyether polyol.

11. The composition of claim 1, wherein the composition further comprises water.

12. The composition of claim 11, wherein the polyethylenimine compound and the sulfite compound present in the composition have a combined weight, and the composition comprises water in an amount of about 1 to about 5 times the combined weight of the polyethylenimine compound and the sulfite compound.

13. The composition of claim 1, wherein the epoxide compound is selected from the group consisting of ethylene oxide, propylene oxide, butylene oxide, glycidol, and mixtures thereof.

14. The composition of claim 13, wherein the epoxide compound is selected from the group consisting of ethylene oxide, propylene oxide, and mixtures thereof.

15. The composition of claim 1, wherein the multifunctional initiator compound is selected from the group consisting of water, glycerin, pentaerythritol, ethylene glycol, propylene glycol, trimethylolpropane, ethylene diamine, and mixtures thereof.

* * * * *